United States Patent [19]

Buck

[11] Patent Number: 5,566,589
[45] Date of Patent: Oct. 22, 1996

[54] BICYCLE CRANK ARM EXTENDER

[76] Inventor: Vernon E. Buck, 12381 E. Potter Rd., Davison, Mich. 48423

[21] Appl. No.: 520,084

[22] Filed: Aug. 28, 1995

[51] Int. Cl.$^6$ ...................................................... B62M 3/02
[52] U.S. Cl. .......................................... 74/594.1; 403/104
[58] Field of Search ............................. 74/594.1, 594.3, 74/544, 546, 594.7; 403/109, 104 X

[56] References Cited

U.S. PATENT DOCUMENTS

| | | |
|---|---|---|
| 625,986 | 5/1899 | Pennock . |
| 823,712 | 6/1906 | Uhlmann . |
| 3,922,929 | 12/1975 | Marchello . |
| 4,648,287 | 3/1987 | Preskitt . |
| 4,850,245 | 7/1989 | Feamster et al. . |
| 4,882,945 | 11/1989 | Trevizo . |
| 4,915,374 | 4/1990 | Watkins . |
| 5,161,430 | 11/1992 | Febey . |

FOREIGN PATENT DOCUMENTS 22058 of 1901 United Kingdom .

*Primary Examiner*—Rodney H. Bonck
*Assistant Examiner*—Mary Ann Battista
*Attorney, Agent, or Firm*—Richard C. Litman

[57] ABSTRACT

A simple, finitely indexable bicycle crank arm extender that is readily, universally and securably installable on a bicycle crank arm including an elongated member having an inner end, an outer end and a plurality of transverse, threaded throughbores. The inner end of the elongated member mounts on the crank arm with a U-bolt that clamps the elongated member and crank arm together. The outer end of the elongated member mounts on the crank arm with a threaded fastener that is received in the distally-disposed threaded bore of the crank arm and threadingly engages one of the plurality of threaded throughbores in the elongated member. A pedal is rotatably mounted at the outer end of the elongated member.

8 Claims, 2 Drawing Sheets

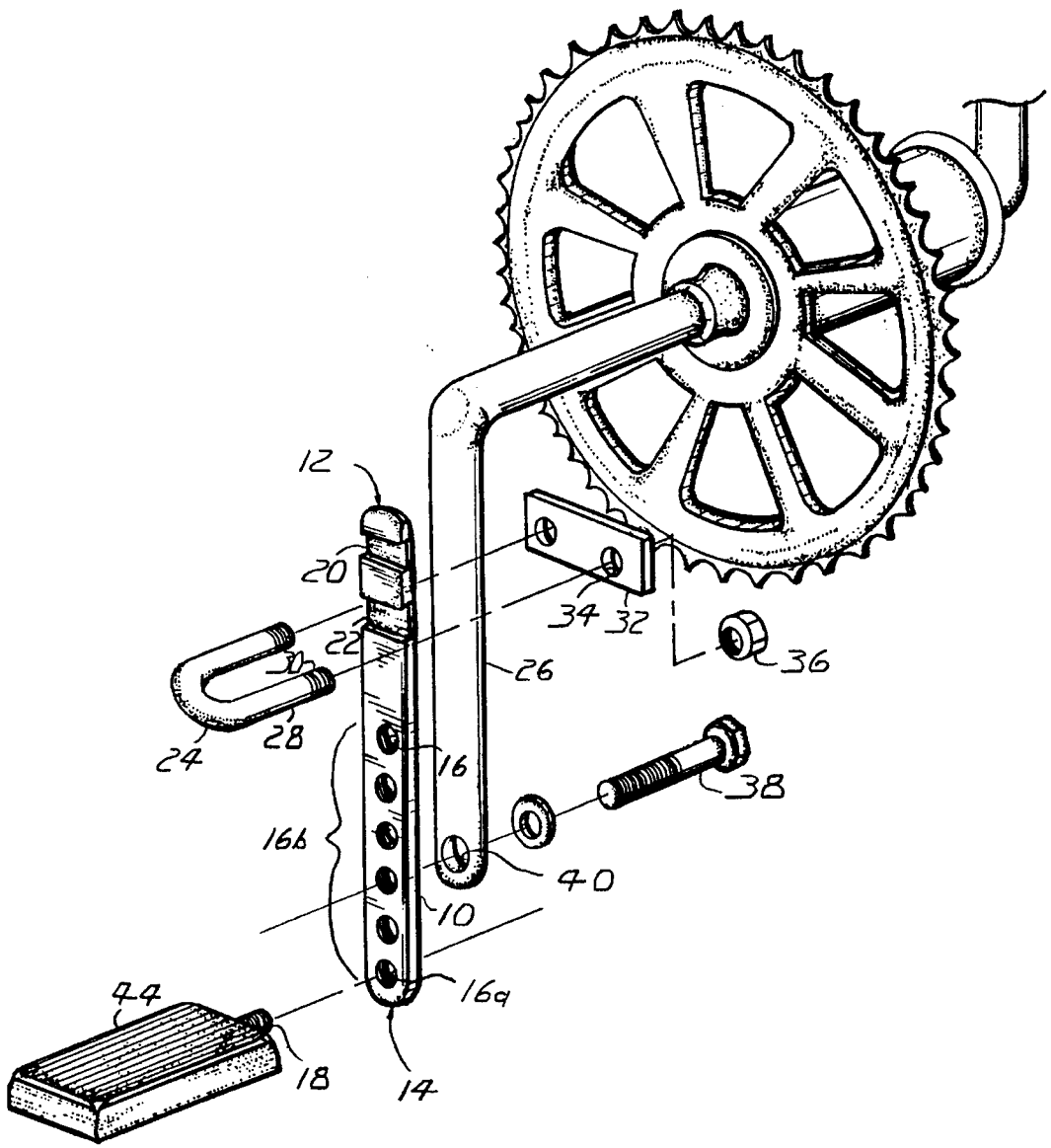

BICYCLE CRANK ARM EXTENDER

BACKGROUND OF THE INVENTION

1. Field of the Invention

This invention relates to velocipedes. More specifically, the present invention relates to crank arm extenders for velocipedes.

2. Description of the Prior Art

Achieving optimum performance on a bicycle depends significantly on properly fitting the bicycle to the cyclist. Naturally, the position of the cyclist relative to the handle bars and pedals is important to extracting maximum output with minimized discomfort. Additionally, the length of the pedalling stroke, as measured from apex to nadir, is crucial to balancing the cyclist's power with endurance. For example, some cyclists prefer a longer pedalling stroke for cycling up hills and prefer shorter ones for flat rides. The length of the pedalling stroke depends on the length of the crank arm; longer crank arms yield longer pedalling strokes. The stroke should be the same for each leg, absent physical necessity, to avoid erratic performance and discomfort.

Cyclists have at their disposal a wide range of one-piece crank arms having different sizes which may be interchanged. However, changing crank arms typically necessitates transferring the sprockets from the undesired crank arm to the desired crank arm and re-tuning the front derailleur, at a minimum. This is inconvenient.

Cyclists also have at their disposal a wide range of multiple-piece, crank arm extenders. Some are infinitely indexable, rendering them difficult to provide uniform pedalling strokes for each foot. Other crank arm extenders may be finitely indexable. However, typically these include complex mechanisms that add weight and failure modes to the bicycle. Still others simply do not lend themselves to universal adaptation to all bicycle crank arms. A need exists for simple, finitely indexable bicycle crank arm extender that is readily, universally and securably installable on a bicycle crank arm.

Several types of bicycle crank arm extenders are described in the patent literature. Unfortunately, as reviewed above, the apparatuses described provide complex mechanisms that add weight to a bicycle and/or do not readily adapt to all bicycle crank arms. For example, U.S. Pat. No. 625,986, issued May 30, 1899, to Frederick G. Pennock, describes an adjustable crank for velocipedes. The apparatus includes a square-shaped sleeve mounted on a crank shaft. The invention includes a crank with a shank portion and a tapered portion. A pedal mounts at the end of the tapered portion. A longitudinal, threaded bore is disposed at the end of the shank portion. The shank portion further has a square-shaped cross section that is slidingly received in the sleeve. A shoulder is disposed at the transition point between the tapered and shank portions. A leaf spring lays against one of the flat sides of the shank, extending therebeyond, and abuts the shoulder. The crank is slidingly adjusted within the sleeve and fixed therein by tightening a threaded fastener in the threaded bore against the free end of the spring. The spring is urged to bend and frictionally engage the sleeve. The extender is infinitely indexable.

U.S. Pat. No. 823,712, issued Jun. 19, 1906, to Bernhard Uhlmann, describes an adjustable pedal crank for bicycles. The device includes a two-piece crank with an inner piece that slides between two positions relative to and within an outer piece. The inner piece is fixed relative to the outer piece with lock means that may be selectably tripped with an eccentric mechanism.

U.S. Pat. No. 3,922,929, issued Dec. 2, 1975, to John L. Marchello, describes a bicycle pedal crank extender. The apparatus includes an elongated member having a transverse slot and a transverse flange which, in cross section, has a U shape. The bicycle crank arm is slidingly received between the legs of the flange. A threaded fastener is received through the slot and threadingly engages with the distally-disposed threaded bore of the crank arm, clampingly securing the elongated member to the crank arm. The elongated member further has a threaded bore for receiving the pedal. The extender is infinitely indexable.

U.S. Pat. No. 4,648,287, issued Mar. 10, 1987, to Jay Preskitt, describes a pedal stroke adjuster for a bicycle or exercise machine. The device includes an elongated member that mounts permanently onto a bicycle crank arm. The elongated member has an elongated, transverse slot in which an adjuster block slides. The transverse slot has a plurality of notches disposed in one side of the slot. The adjuster member has spring-loaded latch means that is selectably inserted into one of the slots, fixing the adjuster block relative to the elongated member.

U.S. Pat. No. 4,850,245, issued Jul. 25, 1989, to Nicholas G. Feamster et al., describes a bicycle crank and pedal structure. The apparatus includes an elongated tube having an inner end and an outer end. A plurality of transverse throughbores are disposed along the length of the tube. A pedal is rotatably mounted on the outer end of the tube. The tube further has a pair of threaded bores which receive threaded fasteners. The crank arm is inserted in the tube, a threaded fastener passes through one of the throughbores in the tube along with the distally-disposed threaded bore of the crank arm, fixing the tube relative to the crank arm. The threaded fasteners are tightened against the crank arm, deterring play between the crank arm and tube.

U.S. Pat. No. 4,882,945, issued Nov. 28, 1989, to Jose Trevizo, describes a pedal extension device. The device includes a sleeve member that slidingly receives a telescoping rod. A pedal is rotatably mounted on the telescoping rod. The invention includes cam means that slides the telescoping member, adjusting the length thereof, corresponding to the rotation of the pedal. The telescoping member is adjusted outwardly during half of a revolution and adjusted inwardly during the second half of the revolution.

U.S. Pat. No. 4,915,374, issued Apr. 10, 1990, to K. Richard Watkins, describes a recumbent exercise cycle with articulated pedals. The invention includes a two-piece crank arm. A first elongated member having a plurality of transverse bores is mounted on the crank shaft. A second elongated member, having a plurality of transverse throughbores, includes a sleeve mounted at one end. The sleeve receives the first elongated member. The sleeve has a transverse bore that receives a bolt. The bolt, received in one of the plurality of transverse bores of the first elongated member, fixes the first elongated member relative to the second elongated member. A pedal is rotatably mounted in one of the transverse throughbores of the second elongated member.

U.S. Pat. No. 5,161,430, issued Nov. 10, 1992, to Richard W. Febey, describes a pedal stroke range adjusting device. The device includes an elongated frame that mounts on a bicycle crank arm. The mounting means include a threaded fastener that is received in the distally-disposed throughbore of the crank arm and threadingly engages with a threaded bore in the frame. The mounting means also includes a pair of threaded fasteners that are received in transverse throughbores in the frame and engage threaded bores of a transverse bar member. The frame includes a pair of parallel, longitudinal flanges that define a slot. A plurality of bores are disposed along the slot. A block member is slidingly received within the slot. The block member includes a latch member that is received in one of the plurality of bores, thus fixing the block member relative to the frame. A pedal is rotatably mounted on the block member.

French Patent No. 876,494, published Nov. 6, 1942, issued to Jules Warmont, shows a crank arm extender. The device includes a frame having parallel flanges. The frame has a throughbore which receives a threaded fastener. The threaded fastener engages with the distally-disposed threaded bore of the crank arm. The flanges restrain the frame from rotating about the throughbore. A pedal is rotatably mounted on the frame. The extender is not indexable.

English Patent No. 22,058, published Dec. 21, 1901, issued to Arthur Dean, describes a new or improved adjustable crank for use with velocipedes and for other purposes. The apparatus includes a two-piece crank arm. A first elongated member has a threaded bore. A second elongated member has external threads that engage the internal threads of the first elongated member. When the two members are threadingly indexed appropriately with respect to each other, a lock ring, slidingly received on the second elongated member, has teeth that engage with notches in the second elongated member, rotationally fixing the first and second elongated members. A nut, threadingly received on the second elongated member, is tightened against the ring.

Clearly, the above demonstrates a need for a simple, finitely indexable bicycle crank arm extender that is readily, universally and securably installable on a bicycle crank arm.

None of the above references, taken alone or in combination, are seen as teaching or suggesting the presently claimed bicycle crank arm extender.

SUMMARY OF THE INVENTION

The present invention overcomes the limitations of the above inventions by providing a simple, finitely indexable bicycle crank arm extender that is readily, universally and securably installable on a bicycle crank arm. The invention includes an elongated member having an inner end, an outer end and a plurality of transverse, threaded throughbores. The inner end of the elongated member mounts on the crank arm with a U-bolt, clampingly encircling the crank arm and elongated member. The outer end of the elongated member mounts on the crank arm with a threaded fastener that is received in the distally-disposed threaded bore of the crank arm and threadingly engages one of the plurality of threaded throughbores in the elongated member. A pedal is rotatably mounted at the outer end of the elongated member.

In consideration of the above, an object of the invention is to provide a bicycle crank arm extender that is simple to manufacture and install. Another object of the invention is to provide a bicycle crank arm extender that universally and securely mounts onto a bicycle crank arm.

A further object of the invention is to provide a bicycle crank arm extender that is indexable between distinct positions relative to the crank arm.

An additional object of the invention is to provide a bicycle crank arm extender that improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 2 is an exploded environmental top perspective view of the invention installed on a bicycle crank arm.

Similar reference characters denote corresponding features of the invention consistently throughout the attached drawings.

DETAILED DESCRIPTION OF THE PREFERRED EMBODIMENT

Figure 1:
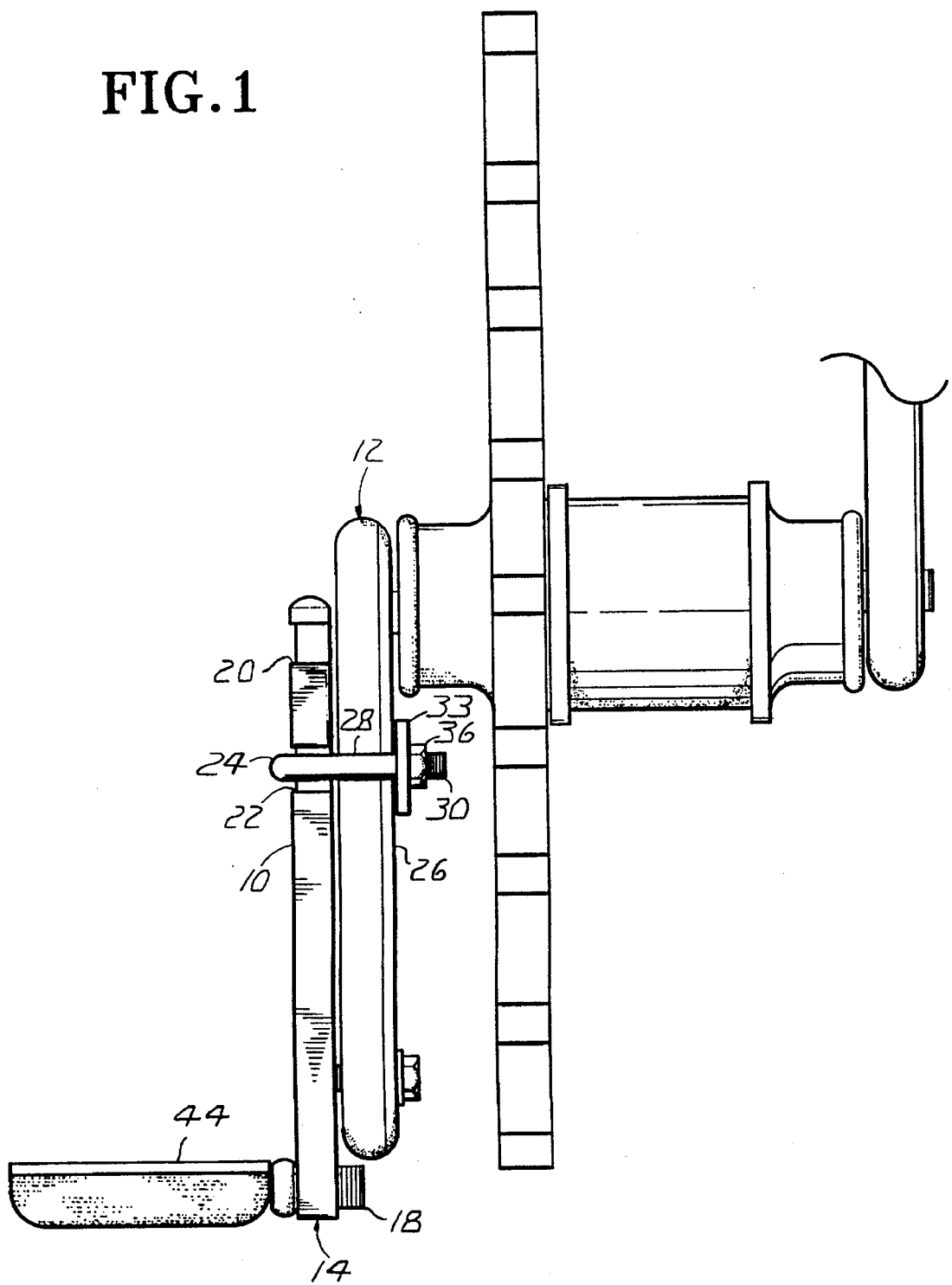
FIG. 1 is an environmental front elevational view of the invention installed on a bicycle crank arm.

Referring to FIG. 1, the invention includes an elongated member 10 having an inner end 12 and an outer end 14. The invention is shown being constructed from steel. However, the invention may be constructed from any rugged metal or even plastic material.

The elongated member 10 has a plurality of transverse, threaded throughbores 16. The throughbore 16a located closest to the outer end 14 should be configured to threadingly receive a conventional pedal spindle 18. The remaining throughbores 16b may assume a configuration variant from the throughbore 16a. For manufacturing ease, the throughbores 16a and 16b may have similar configurations.

The elongated member 10 is shown having two transverse grooves 20 and 22 proximate to the inner end 12. The invention is not limited to providing only two grooves in the elongated member 10. The grooves 20 and 22 are purposed at deterring a U-bolt 24, discussed infra, from sliding along the elongated member 10. Rather than grooves 20 and 22, the elongated member 10 instead may include flanges (not shown) or other equivalent means for maintaining the U-bolt 24. Two or more grooves are provided to accept the U-bolt 24 at a location dictated by the configuration of the crank arm 26 of the bicycle (not shown) on which the invention is to be installed. Longer crank arms would permit the U-bolt 24 to be installed more proximate to the inner end 12, providing a more stable mounting convention. Shorter crank arms require the U-bolt 24 to be received in a groove closer to the outer end 14.

The inner end 12 of the elongated member 10 mounts on a crank arm 26 of a bicycle (not shown) with two fastening means. The first fastening means, as mentioned above, includes a U-bolt 24 received in one of the grooves 20 or 22. The U-bolt 24 includes legs 28, each having threaded segments 30. A plate 32 has a pair of throughbores 34 in registration with the legs 28 of the U-bolt 24. The U-bolt 24 receives the elongated member 10 the crank arm 26. A nut 36 is threadingly received on the threaded segments 30 on each leg 28. The nuts 36 compel the plate 32 against the crank arm 26. The U-bolt 24 and plate 32 cooperatively clamp the elongated member 10 and crank arm 26 together securely.

The second fastening means includes a threaded bolt 3S which is received in the distally-disposed threaded throughbore 40 of the crank arm 26. The bolt 38 engages with one of the threaded throughbores 16b of the elongated member 10. The user may select from any of the throughbores 16b according to the type of riding the user engages. A significant advantage of having distinct throughbores 16b, rather than a slot as shown in the prior art, is that the user is assured that the stroke defined by the invention for one leg is substantially identical with the stroke for the other leg. The bolt 38 urges the elongated member against the crank arm 26. The bolt 38 and U-bolt 24 discourage the elongated member 10 from rotating relative to the crank arm 26.

The pedal 44 mounts on the outer end 14 of the elongated member 10. The pedal spindle 18 is threadingly received in the throughbore 16a of the elongated member 10.

The present invention is not intended to be limited to the sole embodiment described above, but to encompass any and all embodiments within the scope of the following claims.

I claim:

1. An extender for a bicycle crank arm including a pedal, said extender comprising:
    a unitary elongated member having an inner end, an opposing outer end, and a plurality of transverse, threaded throughbores, one of said plurality of transverse, threaded throughbores being proximate to said opposing outer end for receiving the pedal;
    a cylindrical rod member for connecting the crank arm to said elongated member at a second one of said plurality of transverse, threaded throughbores; and
    attaching means for attaching said inner end of said elongated member to the crank arm.

2. An extender for a bicycle crank arm as recited in claim 1, said attaching means for attaching said inner end of said elongated member to the crank arm including:
    a U-bolt with legs having threaded ends;
    a plate having a throughbore for receiving each of said legs of said U-bolt; and
    a threaded nut engaging with each of said threaded ends and abutting said plate;
    said U-bolt and said plate cooperatively encircling said elongated member, each said threaded nut threadingly urging said U-bolt and said plate to cooperatively clamp said elongated member to the crank arm.

3. An extender for a bicycle crank arm as recited in claim 2, said elongated member having at least one groove configured to restrain said U-bolt from sliding therealong.

4. An extender for a bicycle crank arm as recited in claim 1, said rod member having threads which may be threadingly engaged with any one of said plurality of transverse, threaded throughbores.

5. A combination of a bicycle, with at least one crank arm including a pedal, and a bicycle crank arm extender, said extender comprising:
    a unitary elongated member having an inner end and a plurality of transverse, threaded throughbores, one of said plurality of transverse, threaded throughbores threadingly receiving the pedal;
    a cylindrical rod member having threads threadingly engaging the at least one crank arm with said elongated member at a second one of said plurality of transverse, threaded throughbores; and
    attaching means for attaching said inner end of said elongated member to the at least one crank arm.

6. A combination of a bicycle and a bicycle crank arm extender as recited in claim 5, said attaching means for attaching said inner end of said elongated member to the at least one crank arm including:
    a U-bolt with legs having threaded ends;
    a plate having a throughbore for receiving each of said legs of said U-bolt; and
    a threaded nut engaging with each of said threaded ends and abutting said plate;
    said U-bolt and said plate cooperatively encircling said elongated member and the at least one crank arm, each said threaded nut threadingly urging said U-bolt and said plate to cooperatively clamp said elongated member to the at least one crank arm.

7. A combination of a bicycle and a bicycle crank arm extender as recited in claim 6, said elongated member having at least one groove configured to restrain said U-bolt from sliding therealong.

8. An extender for a bicycle crank arm including a pedal, said extender comprising:
    an elongated member having an inner end and a plurality of transverse throughbores, one of said plurality of transverse, throughbores for receivinq the pedal;
    a rod member for connecting the crank arm to said elongated member at one of said plurality of transverse throughbores; and
    attaching means for attaching said inner end of said elongated member to the crank arm;
    said attaching means for attaching said inner end of said elongated member to the crank arm including:
    a U-bolt with legs having threaded ends;
    a plate having a throughbore for receiving each of said legs of said U-bolt; and
    a threaded nut engaging with each of said threaded ends and abutting said plate;
    said U-bolt and said plate cooperatively encircling said elongated member, each said threaded nut threadingly urging said U-bolt and said plate to cooperatively clamp said elongated member to the crank arm;
    said elongated member having at least one groove configured to restrain said U-bolt from sliding therealong; and
    said plurality of transverse throughbores having threads, said rod member having threads threadingly engaging with one of said plurality of transverse throughbores.

* * * * *